United States Patent
Foda

(10) Patent No.: US 12,121,808 B2
(45) Date of Patent: Oct. 22, 2024

(54) METHOD AND COMPUTER DEVICE FOR AUTOMATICALLY APPLYING OPTIMAL CONFIGURATION FOR GAMES TO RUN IN 3D MODE

(71) Applicant: Acer Incorporated, New Taipei (TW)

(72) Inventor: Mohammad Foda, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 315 days.

(21) Appl. No.: 17/822,214

(22) Filed: Aug. 25, 2022

(65) Prior Publication Data
US 2024/0066403 A1    Feb. 29, 2024

(51) Int. Cl.
*A63F 13/52* (2014.01)
*A63F 13/77* (2014.01)

(52) U.S. Cl.
CPC .............. *A63F 13/52* (2014.09); *A63F 13/77* (2014.09); *A63F 2300/552* (2013.01); *A63F 2300/66* (2013.01)

(58) Field of Classification Search
CPC .......... A63F 13/22; A63F 13/25; A63F 13/50; A63F 13/52; A63F 13/77; A63F 2300/552; A63F 2300/66
See application file for complete search history.

(56) References Cited

U.S. PATENT DOCUMENTS

| | | | |
|---|---|---|---|
| 11,321,348 B2 | 5/2022 | McAlister et al. | |
| 2010/0110068 A1* | 5/2010 | Yamauchi | H04N 13/156 348/54 |
| 2012/0218236 A1* | 8/2012 | Hirose | G09G 3/003 345/204 |
| 2019/0094981 A1* | 3/2019 | Bradski | G06V 40/168 |
| 2019/0374855 A1* | 12/2019 | Johnston | H04N 13/254 |

(Continued)

FOREIGN PATENT DOCUMENTS

| | | |
|---|---|---|
| CN | 102648448 A | 8/2012 |
| CN | 108604151 A | 9/2018 |

(Continued)

OTHER PUBLICATIONS

Search Report issued in TW Office Action dated Mar. 29, 2023 in U.S. Appl. No. 11/142,748.

(Continued)

*Primary Examiner* — Omkar A Deodhar
(74) *Attorney, Agent, or Firm* — McClure, Qualey & Rodack, LLP

(57) ABSTRACT

A method for automatically applying the optimal configuration for each of a plurality of games to run in a three-dimensional (3D) mode is provided. The method is executed by a computer device. The method includes the step of copying a first configuration file of the game from a first location to a third location in response to a request for one of the games to be launched in the stereoscopic 3D mode. The method further includes the step of overwriting the first configuration file stored in the first location with a second configuration file from a second location. The method further includes the step of causing the game to launch in the stereoscopic 3D mode. The second set of parameter settings is the optimal configuration for the game to run in the stereoscopic 3D mode.

10 Claims, 4 Drawing Sheets

(56) References Cited

U.S. PATENT DOCUMENTS

| | | | |
|---|---|---|---|
| 2020/0042685 A1 | 2/2020 | Tussy et al. | |
| 2021/0409477 A1* | 12/2021 | Sodagar | H04N 21/6587 |
| 2022/0261631 A1* | 8/2022 | Cohen | G06N 20/00 |
| 2023/0013601 A1* | 1/2023 | Xu | A63F 13/35 |
| 2023/0297440 A1* | 9/2023 | Cowperthwaite | G06F 9/5016 |
| | | | 718/104 |

FOREIGN PATENT DOCUMENTS

| | | |
|---|---|---|
| CN | 109045694 B | 1/2020 |
| CN | 111966275 B | 7/2021 |
| TW | 458334 B | 10/2014 |
| TW | 202120159 A | 6/2021 |

OTHER PUBLICATIONS

TW Office Action dated Mar. 29, 2023 in U.S. Appl. No. 11/142,748.
Extended European Search Report dated Aug. 17, 2023, issued in application No. EP 22198982.5.
Redlarski, J., et al.; "Stereoscopy in Graphics APIs for CAVE Applications;" Proceedings of the Federated Conference on Computer Science and Information Systems; vol. 15; Sep. 2018; pp. 893-896.

* cited by examiner

METHOD AND COMPUTER DEVICE FOR AUTOMATICALLY APPLYING OPTIMAL CONFIGURATION FOR GAMES TO RUN IN 3D MODE

BACKGROUND OF THE INVENTION

Field of the Invention

The present disclosure relates in general to image processing techniques, and it relates in particular to the optimal configurations for games to run in stereoscopic three-dimensional (3D) mode.

Description of the Related Art

The technologies used in 3D graphics have been maturing along with the gaming market demand for years. In general, gaming images with a stereo 3D effect are more visually appealing than conventional, flat 3D (non-stereo) images. However, based on cost-benefit considerations, the majority of popular games are still designed to be displayed normally without stereoscopic 3D.

Since the feeling of novelty and the overall gaming experience will improve if such games could be displayed in stereoscopic 3D despite their original non-stereo 3D design, there is a solution, hereinafter referred to as a "stereoscopy program", for enabling the display of stereoscopic 3D scenes for non-stereo 3D games. In general, the stereoscopy program generates 3D scenes for non-stereo 3D applications by intercepting the function calls sent from the game and inserting additional logic for calling functions before the function calls are transmitted to the graphics driver. This universal approach may work for all games supported by the stereoscopy program.

It is well known that videogames typically have configurable parameters that allow a user to customize the settings for a better gaming experience. However, the original settings (the default settings) of these configurable parameters of the game may be incompatible with the inserted logic of the stereoscopy program. Hence, the settings of the game must be modified to adapt to the stereoscopic 3D display mode, otherwise a variety of abnormalities, such as distortion, blurring, and halo effect in the scene displayed, may occur. Some abnormalities can overstimulate some users' vision and cause minor discomfort, or even daze some users. It would be difficult for users to try and figure out the optimal configuration (the optimal combination of settings of the configurable parameters) through trial-and-error. Making things more complicated, there is no optimal universal configuration that works for all games, because different games and game engines may use different logic, different function calls, or even different graphic APIs. In other words, each of the games supported by the stereoscopy program have their own optimal configuration. Users will be unduly inconvenienced if they need to fine-tune the configuration for every game they want to play, one by one.

In view of the problems described above, it would be desirable to have a method and computer device for automatically applying the optimal configuration for games supported by the stereoscopy program to run in stereoscopic 3D mode.

BRIEF SUMMARY OF THE INVENTION

A method for automatically applying the optimal configuration for each of a plurality of games to run in a three-dimensional (3D) mode is provided by an embodiment of the present disclosure. The method is executed by a computer device. The method includes the step of copying a first configuration file of the game from a first location to a third location in response to a request for one of the games to be launched in stereoscopic 3D mode. The method further includes the step of overwriting the first configuration file stored in the first location with a second configuration file from a second location. The method further includes the step of causing the game to launch in stereoscopic 3D mode. The first configuration file records the first set of parameter settings of the game. The second configuration file records the second set of parameter settings of the game. The second set of parameter settings is the optimal configuration for the game to run in stereoscopic 3D mode.

In some embodiments, the method further includes the step of overwriting the second configuration file stored in the first location with the first configuration file from the third location, in response to the game being ended.

In some embodiments, the method further includes the step of downloading the second configuration file from a server, and the step of storing the second configuration file in the second location.

In some embodiments, the parameter settings include but not limited to the settings for the resolution parameter, the display mode parameter, the deep learning super sampling (DLSS) parameter, the antialiasing parameter such as a multisample anti-aliasing (MSAA), the motion blur parameter, the vertical sync parameter, and the render scale parameter.

In some embodiments, the second set of parameter settings for the game is different than the second set of parameter settings for another game.

A computer device for automatically applying the optimal configuration for each game to run in a three-dimensional (3D) mode is provided by an embodiment of the present disclosure. The computer device a processing unit configured to run a program to execute the steps of the method as described above.

The method and computer device provided by the present disclosure enables the display of 3D scenes for non-stereo 3D games without needing the player's efforts of trying to figure out the optimal configuration for the games to be displayed in stereoscopic 3D mode one by one. As a result, automatic game configuration optimization for stereo 3D gameplay is achieved.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

Figure 1A:
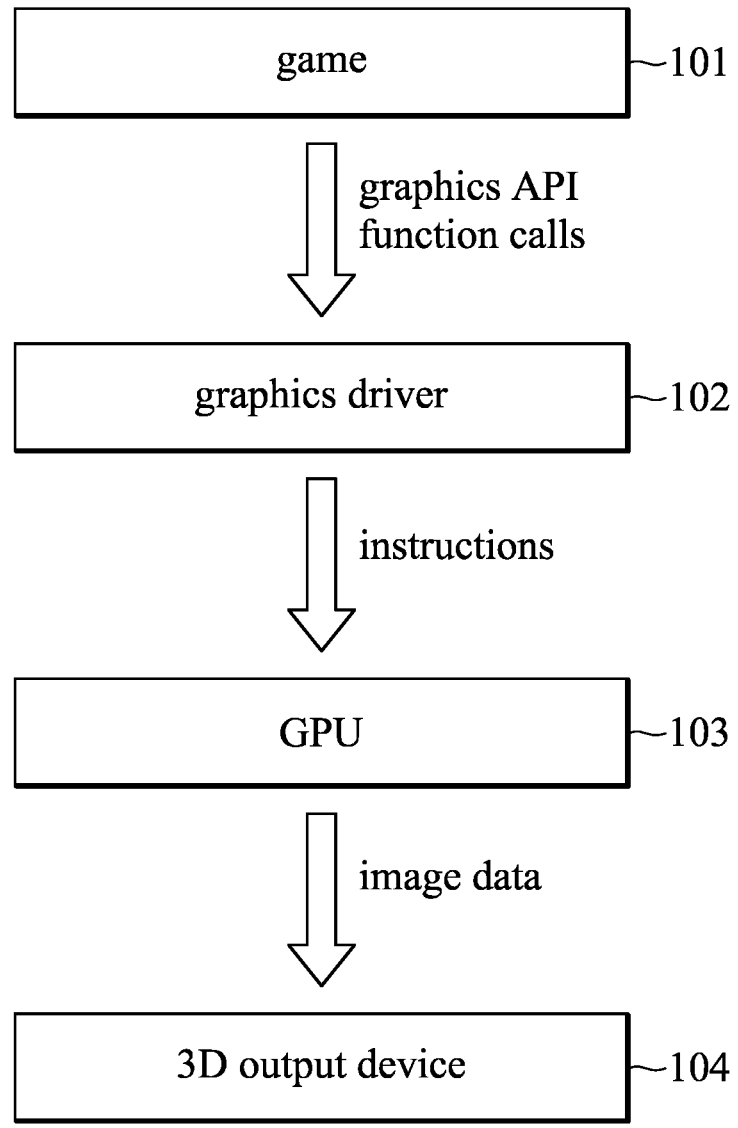
FIG. 1A is a schematic block diagram illustrating the conventional flow of generating and displaying scenes for a game by a computer device.
Figure 1B:
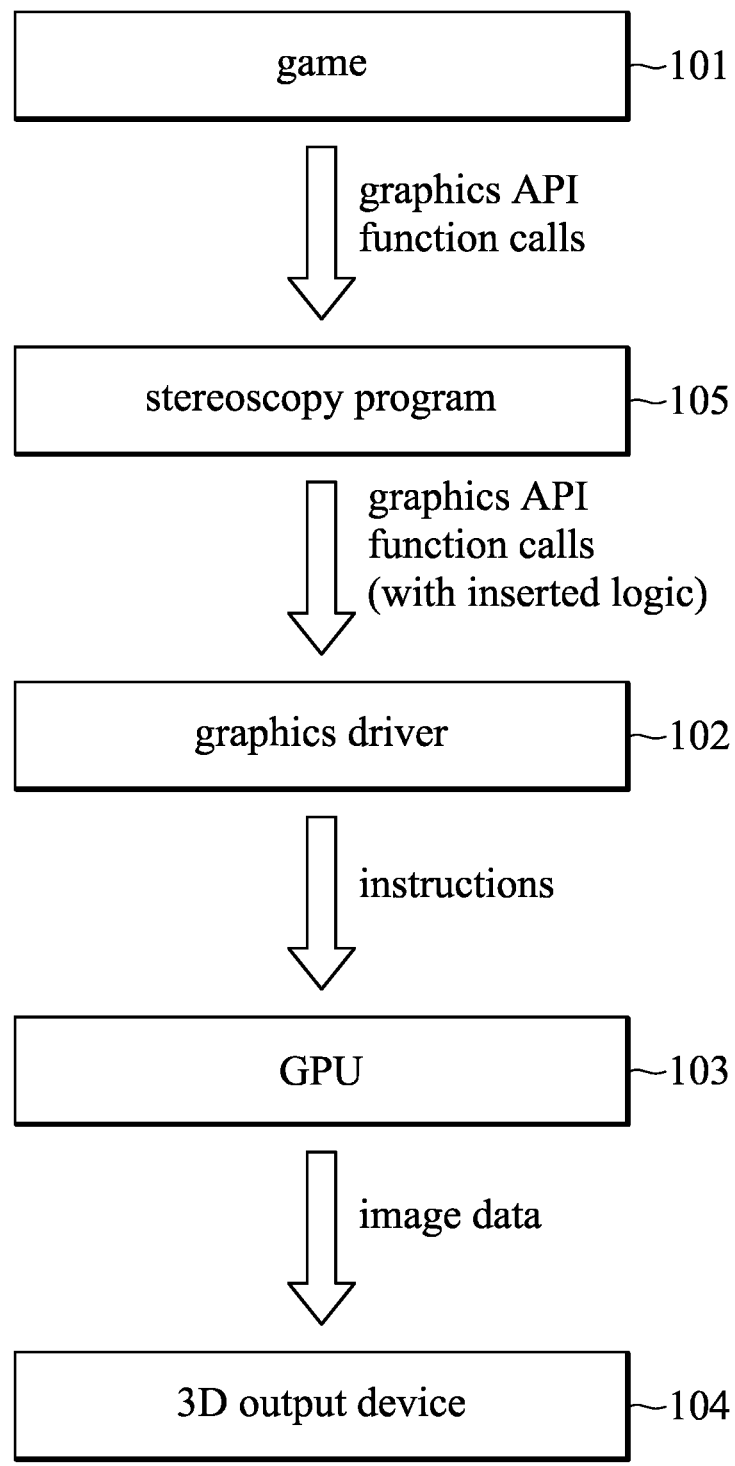
FIG. 1B is a schematic block diagram illustrating the flow of generating and displaying scenes for a game by a computer device, according to an embodiment of the present disclosure.

First, the fundamental of said "stereoscopy program" will be introduced with reference to FIG. 1A and FIG. 1B.

FIG. 1A is a schematic block diagram illustrating the conventional flow of generating and displaying scenes for a game by a computer device. As shown in FIG. 1A, it is required to go through a graphics driver layer (i.e., graphics driver 102) and a graphics processing unit (GPU) layer (i.e., GPU 103) for the scenes of the game 101 to be eventually displayed on the 3D output device 104.

The GPU 103 is a specialized electronic circuit designed to execute computer graphics computing and image processing, for offloading the general-purpose central processing unit (CPU). The GPU 103 is thus more efficient than the general-purpose CPU for computer graphics computing and image processing.

The graphics driver 102 is a set of software programs allowing the operating system (e.g., Windows, Linux, MacOS, etc.), on which the game 101 is installed, to communicate with the GPU 103.

The 3D output device 104 can be any 3D displaying device for displaying 3D visualized information, such as an autostereoscopic display device, 3D/VR glasses, a head mounted display (HMD), a light field output device, 3D projector, etc.

During execution, the game 101 sends function calls to the graphics driver 102, in order to request the GPU to render the image of the game 101. The called functions are typically provided by a graphics application interface (API), such as DirectX (for Microsoft Windows), OpenGL (cross-platform), Glide (cross-platform), Metal (for MacOS or iOS), Vulkan (cross-platform), etc. In response to receiving the function calls, the graphics driver 102 converts them into lower-level instructions that are comprehensible for the GPU 103, and then sends the instructions to the GPU 103. In response to receiving the instructions from the graphics driver 102, the GPU 103 renders image using the called functions and the input parameters thereof. The rendered image are thus sent to the 3D output device 104 to display the scene.

FIG. 1B is a schematic block diagram illustrating the flow of generating and displaying scenes for a game by a computer device, according to an embodiment of the present disclosure. The difference between FIG. 1A and FIG. 1B is that there is an additional layer, the stereoscopy program 105, between the game 101 and the graphics driver 102.

The stereoscopy program 105 is designed for intercepting the function calls sent from the game 101, inserting additional logic for calling functions, and transmitting the function calls with the inserted logic to the graphics driver 102. As a result, the instructions sent from the graphics driver 102 to the GPU 103 are converted from the function calls with inserted logic, instead of the original function calls sent from the game 101. Therefore, even if the game requests the GPU to render the image of the game 101 with non-stereo 3D-based logic, the GPU may eventually render the image of the game 101 with 3D-based logic instead as the stereoscopy program 105 requested.

Figure 2:
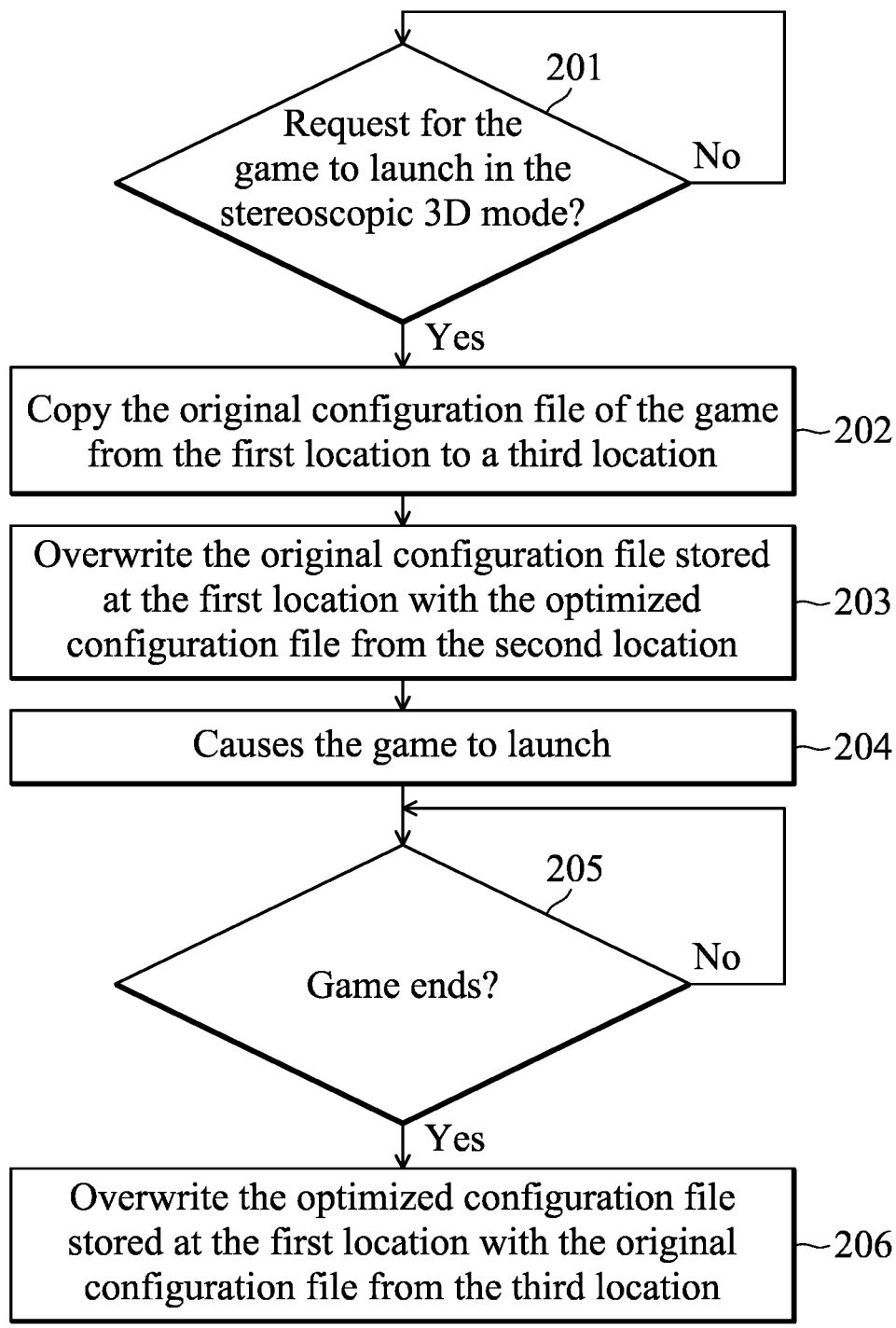
FIG. 2 is the flow diagram of the method for automatically applying the optimal configuration for games to run in stereoscopic 3D mode, according to an embodiment of the present disclosure.

Next, the method for automatically applying the optimal configuration for games supported by the stereoscopy program 105 to run in stereoscopic 3D mode will be introduced with reference to FIG. 2.

FIG. 2 is the flow diagram of the method 200 for automatically applying the optimal configuration for games supported by the stereoscopy program 105 to run in stereoscopic 3D mode, according to an embodiment of the present disclosure. The method 200 may be executed by the processing unit of a computer device. The processing unit may be, for example, a central processing unit (CPU), a general-purpose processor, or the like, but the present disclosure is not limited thereto. As shown in FIG. 2, the method 200 includes steps 201-204, may be executed by the processing unit of the computer device through running the stereoscopy program 105.

In step 201, the stereoscopy program 105 has been launched, and is waiting for the user to request for the game to launch in stereoscopic 3D mode (e.g., user clicks a specific button on the GUI provided by the stereoscopy program 105 using the mouse). In response to receiving the request for the game to launch in stereoscopic 3D mode from the user, the execution of the subsequent step 202 is triggered.

In step 202, the original (or default) configuration file of the game is copied from the first location to a third location. Then, method 200 proceeds to step 203.

The original configuration file is provided by the game developer and/or configurable by the user, used for recording a set of original (or default) parameter settings of the game which can be configured by the user. If the user chooses to launch the game normally without stereo 3D, the set of original parameter settings will be applied to the game. The file extension name of the original configuration file can be ".ini", ".cfg", ".conf", ".txt", etc. The file format of the original configuration file is not limited by the present disclosure.

The first location indicates the location of the set of original parameter settings are stored, which is typically designated by the game developer and/or configurable by the user. The first location can be under the game folder, or under a folder containing custom settings and other information needed by applications, such as a hidden folder "AppData" located at C:\Users\<username>\AppData in Microsoft Windows. The path of the first location is not limited by the present disclosure.

The third location indicates the location for storing the backup of the original configuration file, which is designated by the developer of the stereoscopy program. Except that the third location shall not be identical to the first location, the path of the third location is not limited by the present disclosure.

In step 203, the original configuration file stored in the first location is overwritten with the optimized configuration file from the second location. Then, method 200 proceeds to step 204.

The optimized configuration file is used for recording a set of parameter settings of the game which has been optimized for the stereoscopic 3D mode. The set of optimized parameters can be provided by the developer of the stereoscopy program 105, but the present disclosure is not limited thereto. Who optimizes the set of parameter settings, and how the set of parameter settings are optimized (e.g., defining the configuration based on the platform (hardware and/or software) requirements), are both not limited by the present disclosure. In some embodiments, the set of optimized parameter settings for the game is different than the set of optimized parameter settings for another game supported by the stereoscopy program 105.

The second location indicates the location for storing the optimized configuration file, which is designated by the developer of the stereoscopy program. Except that the second location shall not be identical to the first location, the path of the second location is not limited by the present disclosure.

It should be noted that the overwriting in step 203 only replaces the content of the original configuration file (i.e., the set of original parameter settings) with the content of the optimized configuration file (i.e., the set of optimized parameter settings) but does not change the filename of the original configuration file.

In step 204, the game is caused to launch in the stereoscopic 3D mode by the stereoscopy program. Since the overwriting in step 203 only replaces the content of the original configuration file (i.e., the set of original parameter settings) with the content of the optimized configuration file (i.e., the set of optimized parameter settings) but does not change the filename of the original configuration file, the launched game will apply the set of optimized parameter settings instead of the set of original parameter settings. Then, method 200 proceeds to step 205.

In step 205, method 200 wait until the end of the game (i.e., the user close the game window). In response to the end of the game, the execution of the subsequent step 206 is triggered.

In step 206, the optimized configuration file stored in the first location is overwritten with the original configuration file from the third location. In other words, the original configuration file in the first location is restored from the backup copy that is stored in the third location. As such, if the user chooses to launch the game normally without stereo 3D next time, the game will apply the settings recorded in the original configuration file instead of the optimized configuration file.

In some embodiments, the latest optimized configuration file will be placed on the server by the developer for all users to download. Thus, the method introduced may further include steps for obtaining the optimized configuration file from the server.

Figure 3:
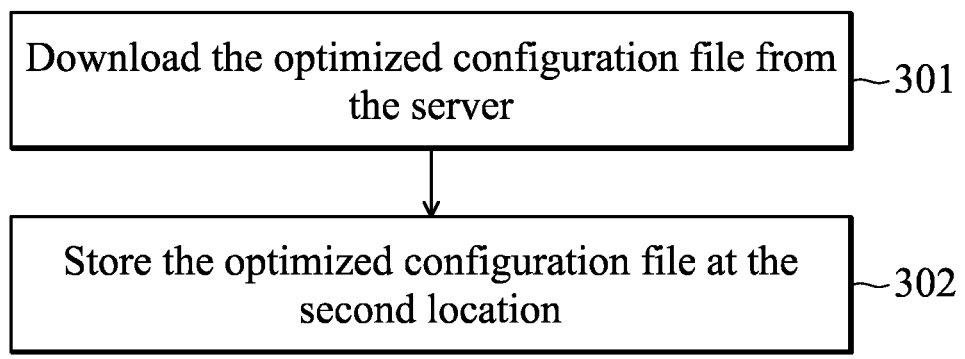
FIG. 3 is the flow diagram illustrating the steps for obtaining the optimized configuration file from the server, according to an embodiment of the present disclosure.

FIG. 3 is the flow diagram illustrating the steps 301-302 for obtaining the optimized configuration file from the server, according to an embodiment of the present disclosure. As shown in FIG. 3, in step 301, the optimized configuration file is downloaded from the server. Then, in step 302, the optimized configuration file is stored in the second location. It should be appreciated that if an optimized configuration file already exists in the second location, it will be replaced or overwritten by the downloaded one. As such, when there is an update for the optimized configuration file, users just need to download the latest optimized configuration file from the server, without needing to update the whole stereoscopy program. On the contrary, if no optimized configuration file exists yet, a new one will be created using the downloaded optimized configuration file.

In some embodiments, the parameter settings include but not limited to the settings for the resolution parameter, the display mode parameter, the deep learning super sampling (DLSS) parameter, the anti-aliasing parameter such as a multisample anti-aliasing (MSAA) parameter, the motion blur parameter, the vertical sync parameter, and the render scale parameter. The resolution parameter determines the width and height of the game window. The display mode parameter determines if the game is displayed in a window mode, a full screen mode, or a borderless mode. The DLSS parameter determines whether to enable higher graphical settings or frame rates for a given output resolution. The anti-aliasing parameter such as MSAA parameter determines whether to enable spatial anti-aliasing to remove jaggies in the images. The motion blur parameter determines whether to enable the apparent streaking of moving objects in the images. The vertical sync parameter determines whether to enable the synchronization of the game's frame rate with the monitor's refresh rate. The render scale parameter determines the internally rendered resolution of the game before it gets downscaled or upscaled to the set resolution. The optimal combination of settings for the parameters (not limited to the listed examples above) will be different for each game supported by the stereoscopy program.

The steps of the methods and algorithms provided in the present disclosure may be directly applied to a hardware and a software module or a combination thereof by executing a processor. A software module (including executing instructions and related data) and other data may be stored in a data memory, such as random access memory (RAM), flash memory, read-only memory (ROM), erasable programmable read only memory (EPROM), electrically erasable programmable read only memory (EEPROM), registers, hard drives, portable drives, CD-ROM, DVD, or any other computer-readable storage media format in the art. For example, a storage media may be coupled to a machine device, such as a computer/processor (denoted by "processor" in the present disclosure, for the convenience of explanation). The processor may read information (such as codes) from and write information to a storage media. A storage media may integrate a processor. An application-specific integrated circuit (ASIC) includes the processor and the storage media. A viewer apparatus includes an ASIC. In other words, the processor and the storage media are included in the viewer apparatus without directly connecting to the viewer apparatus. Besides, in some embodiments, any product suitable for computer programs includes a readable storage media, wherein the storage media includes codes related to one or more disclosed embodiments. In some embodiments, the computer program product may include packaging materials.

The method and computer device provided by the present disclosure enables the display of 3D scenes for non-stereo 3D-based games without needing the player's efforts of trying to figure out the optimal configuration for the games to be displayed in stereoscopic 3D mode one by one. As a result, automatic game configuration optimization for stereo 3D gameplay is achieved.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for automatically applying an optimal configuration for each of a plurality of games to run in a stereoscopic three-dimensional (3D) mode, executed by a computer device, comprising the following steps:
    in response to a request for one of the games to be launched in the stereoscopic 3D mode, copying a first configuration file of the game from a first location to a third location, wherein the first configuration file records a first set of parameter settings of the game; and
    overwriting the first configuration file stored in the first location with a second configuration file from a second location, wherein the second configuration file records a second set of parameter settings of the game;
    causing the game to launch in the stereoscopic 3D mode;
    wherein the second set of parameter settings is the optimal configuration for the game to run in the stereoscopic 3D mode.

2. The method as claimed in claim 1, further comprising:
    overwriting the second configuration file stored in the first location with the first configuration file from the third location, in response to the game being ended.

3. The method as claimed in claim 1, further comprising:
    downloading the second configuration file from a server; and
    storing the second configuration file in the second location.

4. The method as claimed in claim 1, wherein the parameter settings comprise settings for a resolution parameter, a display mode parameter, a deep learning super sampling (DLSS) parameter, a multisample anti-aliasing (MSAA) parameter, a motion blur parameter, a vertical sync parameter, and a render scale parameter.

5. The method as claimed in claim 1, wherein the second set of parameter settings for the game is different than the second set of parameter settings for another one of the games.

6. A computer device, comprising a processing unit configured to run a program to execute the steps of the method as claimed in claim 1.

7. A computer device, comprising a processing unit configured to run a program to execute the steps of the method as claimed in claim 2.

8. A computer device, comprising a processing unit configured to run a program to execute the steps of the method as claimed in claim 3.

9. A computer device, comprising a processing unit configured to run a program to execute the steps of the method as claimed in claim 4.

10. A computer device, comprising a processing unit configured to run a program to execute the steps of the method as claimed in claim 5.

* * * * *